(12) United States Patent  
Shibano

(10) Patent No.: US 11,961,968 B2
(45) Date of Patent: Apr. 16, 2024

(54) LITHIUM ION SECONDARY BATTERY

(71) Applicant: NISSAN CHEMICAL CORPORATION, Tokyo (JP)

(72) Inventor: Yuki Shibano, Funabashi (JP)

(73) Assignee: NISSAN CHEMICAL CORPORATION, Tokyo (JP)

(*) Notice: Subject to any disclaimer, the term of this patent is extended or adjusted under 35 U.S.C. 154(b) by 806 days.

(21) Appl. No.: 17/046,135

(22) PCT Filed: Mar. 28, 2019

(86) PCT No.: PCT/JP2019/013593
§ 371 (c)(1),
(2) Date: Oct. 8, 2020

(87) PCT Pub. No.: WO2019/198530
PCT Pub. Date: Oct. 17, 2019

(65) Prior Publication Data
US 2021/0036372 A1    Feb. 4, 2021

(30) Foreign Application Priority Data

Apr. 9, 2018 (JP) ................................. 2018-074734

(51) Int. Cl.
| | | |
|---|---|---|
| H01M 4/505 | (2010.01) | |
| H01M 4/525 | (2010.01) | |
| H01M 10/0525 | (2010.01) | |
| H01M 10/0567 | (2010.01) | |
| H01M 10/0568 | (2010.01) | |
| H01M 10/0569 | (2010.01) | |
| H01M 4/02 | (2006.01) | |

(52) U.S. Cl.
CPC ....... *H01M 10/0569* (2013.01); *H01M 4/505* (2013.01); *H01M 4/525* (2013.01); *H01M 10/0525* (2013.01); *H01M 10/0567* (2013.01); *H01M 10/0568* (2013.01); *H01M 2004/027* (2013.01); *H01M 2004/028* (2013.01); *H01M 2300/0028* (2013.01); *H01M 2300/0082* (2013.01)

(58) Field of Classification Search
CPC ........ H01M 4/505; H01M 4/525; H01M 4/13; H01M 10/0525; H01M 10/0569; H01M 10/0568
See application file for complete search history.

(56) References Cited

U.S. PATENT DOCUMENTS

| | | | | |
|---|---|---|---|---|
| 2003/0124432 A1* | 7/2003 | Miura | ................. | H01M 10/052 429/316 |
| 2009/0325065 A1* | 12/2009 | Fujii | ................. | H01M 10/0569 429/207 |
| 2019/0036156 A1 | 1/2019 | Qiao et al. | | |

FOREIGN PATENT DOCUMENTS

| | | |
|---|---|---|
| CN | 102263292 A | 11/2011 |
| CN | 103682437 A | 3/2014 |
| CN | 104124470 A | 10/2014 |
| JP | 4-184870 A | 7/1992 |
| JP | 7-220757 A | 8/1995 |
| JP | 8-236155 A | 9/1996 |
| JP | 9-45369 A | 2/1997 |
| JP | 11-297355 A | 10/1999 |
| JP | 2000-90970 A | 3/2000 |
| JP | 2000-156243 A | 6/2000 |
| JP | 2004-342537 A | 12/2004 |
| JP | 2005-116424 A | 4/2005 |
| JP | 2006-19070 A | 1/2006 |
| JP | 2014-67585 A | 4/2014 |

(Continued)

OTHER PUBLICATIONS

Machine Translation of: Guo et al., CN 102263292 A, Nov. 30, 2011.*

(Continued)

*Primary Examiner* — Kenneth J Douyette
(74) *Attorney, Agent, or Firm* — Birch, Stewart, Kolasch & Birch, LLP

(57) ABSTRACT

The present invention provides a lithium ion secondary battery which is provided with: a nonaqueous electrolyte solution; and a positive electrode and a negative electrode, each of which is capable of absorbing and desorbing lithium. This lithium ion secondary battery is configured such that the nonaqueous electrolyte solution contains (A) an electrolyte, (B) a nonaqueous organic solvent and (C) a compound that is obtained by substituting at least one hydrogen atom, which is bonded to a carbon atom in an aromatic ring of a compound that has at least one aromatic ring and no amino group, by a group that is represented by formula (1); and this lithium ion secondary battery is charged at a voltage within the range of 4.35-5 V for use.

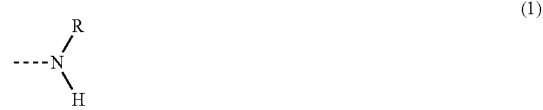

(1)

(In the formula, R represents a hydrogen atom, an optionally substituted monovalent aliphatic hydrocarbon group having 1-60 carbon atoms, an optionally substituted monovalent aromatic hydrocarbon group having 6-60 carbon atoms, or an optionally substituted monovalent heterocyclic ring-containing group having 2-60 carbon atoms; and the broken line represents a bonding hand).

10 Claims, No Drawings

(56) References Cited

FOREIGN PATENT DOCUMENTS

JP  2014-175192 A  9/2014
WO  WO 2017/128989 A1  8/2017

OTHER PUBLICATIONS

"Anodic oxidation of p-phenylenediamines in battery grade electrolytes", Deunf et al., Apr. 4, 2018. Retrieved online on Jul. 18, 2023 from: https://univ-rennes.hal.science/hal-01713511.*
International Search Report issued in PCT/JP2019/013593 (PCT/ISA/210), dated Jun. 11, 2019.
Written Opinion of the International Searching Authority issued in PCT/JP2019/013593 (PCT/ISA/237), dated Jun. 11, 2019.
Taiwanese Office Action and Search Report for Taiwanese Application No. 108112063, dated Oct. 4, 2022.

* cited by examiner

LITHIUM ION SECONDARY BATTERY

TECHNICAL FIELD

The present invention relates to a lithium ion secondary battery.

BACKGROUND ART

In response to demand for reduction in size and weight and increased functions for mobile electronic devices such as smartphones, digital cameras, and portable game machines, the development of high-performance batteries has been actively advanced in recent years, and the demand for secondary batteries that can be charged and used repeatedly has been growing significantly. Among the batteries, the lithium ion secondary battery is the most actively developed secondary battery now, because the battery has a high energy density, a high voltage and has no memory effect during charging and discharging. In addition, for approaches to recent environmental issues, the development of electric vehicles has been actively advanced, and higher performance has been required for secondary batteries as power sources therefor.

In the case of applying secondary batteries to power supplies of environmentally compatible vehicles such as electric vehicles and plug-in hybrid vehicles, and furthermore, infrastructure equipment such as large-scale electricity storage systems for energy storage, higher degrees of reliability and safety than ever as well as improved performance are required. The increased energy density and output of the battery for increasing the battery performance, however, inevitably makes the battery more likely to cause thermal runaway in situations such as where the battery is anomalously heated or short-circuited, thereby tending to decrease the safety.

A lithium ion secondary battery has a structure that houses a positive electrode and a negative electrode capable of occluding and releasing lithium and a separator interposed therebetween in a container filled with an electrolyte solution (a gel or all-solid-state electrolyte in the case of a lithium ion polymer secondary battery, in place of a liquid electrolyte solution). A lithium complex oxide such as $LiCoO_2$ is used as a positive electrode active material, and a carbon material such as graphite is used as a negative electrode active material. Such a lithium ion secondary battery is commonly used with an operating voltage of 2.5 to 4.2 V.

As described above, the range in application of lithium ion secondary batteries continues to expand, and for the purpose of further improvement in performance, the increased energy density of the positive electrode active material has been examined with the charging voltage higher than 4.2 V.

The increased charging voltage makes the battery more likely to cause thermal runaway in an abnormal situation such as an internal short circuit in the battery, due to factors such as the accelerated reaction between the vicinity of the positive electrode surface and the electrolyte solution, in particular, at high temperatures, thereby significantly decreasing the safety of the battery.

Various attempts have been made to improve the safety of lithium ion secondary batteries against short circuits. For example, attempts of adding a phosphorus-based material to an electrolyte solution in Patent Documents 1 and 2 and adding an ionic liquid to an electrolyte solution in Patent Documents 3 and 4 are respectively made to make the electrolyte solutions flame-retardant and thus improve the safety of batteries. With these materials only, however, the battery performance is decreased due to the low ionic conductivity, and the materials are essentially used in combination with carbonate-based solvents commonly for use as a main solvent in lithium ion secondary batteries. Because these carbonate-based solvents are flammable, the addition of large amounts of phosphorus-based material and ionic liquid is required in order to make the nonaqueous electrolyte solutions flame-retardant, thereby resulting in worse battery performance and even higher costs than in the case of using only a carbonate-based solvent.

Therefore, in order to overcome the shortcomings of conventional organic electrolytes and additives, attempts have been made to modify electrode materials and develop new electrolytes containing additives.

PRIOR ART DOCUMENTS

Patent Documents

Patent Document 1: JP-A H04-184870
Patent Document 2: JP-A 2005-116424
Patent Document 3: JP-A H11-297355
Patent Document 4: JP-A 2006-19070

SUMMARY OF INVENTION

Technical Problem

The present invention has been achieved in view of the foregoing circumstances, and an object of the invention is to provide a lithium ion secondary battery that is charged to a high voltage such as 4.35 to 5 V for use, with improved safety against short circuits.

Solution to Problem

The inventor has, as a result of earnest studies for achieving the object mentioned above, found that the use of a nonaqueous electrolyte solution containing an additive that has a specific structure improves the safety against short circuits in a lithium ion battery that is charged to 4.35 to 5 V for use, thereby achieving the present invention.

More specifically, the present invention provides the following lithium ion secondary battery.

1. A lithium ion secondary battery including a nonaqueous electrolyte solution, and a positive electrode and a negative electrode capable of occluding and releasing lithium, wherein the nonaqueous electrolyte solution includes an (A) electrolyte, a (B) nonaqueous organic solvent, and a (C) compound having at least one aromatic ring and having no amino group, where at least one of hydrogen atoms bonded to a carbon atom of the aromatic ring of the compound is substituted with a group represented by the following formula (1), and the lithium ion secondary battery charged in the range of 4.35-5 V for use.

[Chem. 1]

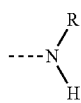

(1)

wherein R represents a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$;

$Z^1$ represents a halogen atom, an amino group, a hydroxy group, a nitro group, a cyano group, an oxo group, a carboxy group, a sulfo group, a phosphoric acid group, a thiol group, a silyl group, or a monovalent aromatic hydrocarbon group having 6 to 60 carbon atoms or a monovalent heterocyclic ring-containing group having 2 to 60 carbon atoms, which is optionally substituted with $Z^3$;

$Z^2$ represents a halogen atom, an amino group, a hydroxy group, a nitro group, a cyano group, an oxo group, a carboxy group, a sulfo group, a phosphoric acid group, a thiol group, a silyl group, or a monovalent aliphatic hydrocarbon group having 1 to 60 carbon atoms, which is optionally substituted with $Z^3$;

$Z^3$ represents a halogen atom, an amino group, a hydroxy group, a nitro group, a cyano group, an oxo group, a carboxy group, a sulfo group, a phosphoric acid group, a silyl group, or a thiol group; and the broken line is a bond.

2. The lithium ion secondary battery according to 1, wherein the compound of the component (C) included in the nonaqueous electrolyte solution includes at least two substituents represented by the formula (1).

3. The lithium ion secondary battery according to 1 or 2, wherein R represents a hydrogen atom.

4. The lithium ion secondary battery according to any of 1 to 3, wherein the compound of the component (C) is represented by any of the following formulas (2) to (4):

[Chem. 2]

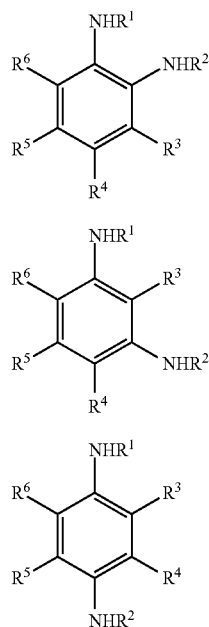

wherein $R^1$ and $R^2$ each independently represent a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$;

$R^3$ to $R^6$ each independently represent a hydrogen atom, a monovalent aliphatic hydrocarbon group having 1 to 60 carbon atoms, which is optionally substituted by $Z^1$, a monovalent aromatic hydrocarbon group having 6 to 60 carbon atoms, which is optionally substituted by $Z^2$, a monovalent heterocyclic ring-group having 2 to 60 carbon atoms, which is optionally substituted with $Z^2$, a halogen atom, a hydroxy group, a nitro group, a cyano group, a boronic acid group, a sulfonic acid group, a phosphoric acid group, a silyl group, a thiol group, —O—$R^A$, —O—C(=O)—$R^B$, or —C(=O)—O—$R^C$, and $R^A$, $R^B$, and $R^C$ each independently represent a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$; and $Z^1$ and $Z^2$ represent the same as mentioned above.

5. The lithium ion secondary battery according to 4, wherein $R^1$ and $R^2$ both represent hydrogen atoms.

6. The lithium ion secondary battery according to 4 or 5, wherein $R^3$ to $R^6$ all represent hydrogen atoms.

7. The lithium ion secondary battery according to any of 1 to 6, wherein the compound of the component (C) is contained at 0.01 to 10% by weight in the nonaqueous electrolyte solution.

8. The lithium ion secondary battery according to any of 7, wherein the compound of the component (C) is contained at 0.1 to 1% by weight in the nonaqueous electrolyte solution.

9. The lithium ion secondary battery according to any of 1 to 8, wherein the positive electrode active material included in the positive electrode is a lithium composite layer oxide.

10. The lithium ion secondary battery according to 9, wherein the lithium composite layer oxide is a compound represented by the following formula (6):

$$Li(Ni_aCo_bMn_c)O_2 \quad (6)$$

wherein a, b, and c are numbers that satisfy $0 \leq a \leq 1$, $0 \leq b \leq 1$, $0 \leq c \leq 1$, and $a+b+c=1$.

11. The lithium ion secondary battery according to 10, wherein the compound represented by the formula (6) is $LiCoO_2$.

Advantageous Effects of Invention

The lithium ion secondary battery according to the present invention has, even though the battery is charged to a high voltage such as 4.35 to 5 V, safety improved against short circuits, due to the use of the nonaqueous electrolyte solution containing the additive that has a specific structure. Therefore, the lithium ion secondary battery according to the present invention is capable of achieving power supplies of environmentally compatible vehicles such as safe electric vehicles and plug-in hybrid vehicles, and furthermore, infrastructure equipment such as large-scale electricity storage systems for energy storage.

DESCRIPTION OF EMBODIMENTS

[Lithium Ion Secondary Battery]

The lithium ion secondary battery according to the present invention includes a nonaqueous electrolyte solution, and a positive electrode and a negative electrode capable of occluding and releasing lithium.

[Nonaqueous Electrolyte Solution]

The nonaqueous electrolyte solution includes an (A) electrolyte, a (B) nonaqueous organic solvent, and a (C) compound having at least one aromatic ring and having no amino group, where at least one of hydrogen atoms bonded to a carbon atom of the aromatic ring of the compound is substituted with an optionally substituted amino group.

[Component (A)]

As the electrolyte of the component (A), electrolytes conventionally known for lithium ion secondary batteries can be used. Specific examples thereof include lithium salts such as lithium tetrafluoroborate, lithium hexafluorophosphate, lithium perchlorate, and lithium trifluoromethanesulfonate; quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate, and tetraethylammonium perchlorate; lithium imides such as lithium bis(trifluoromethanesulfonyl)imide and lithium bis(fluorosulfonyl)imide; and lithium borate salts such as lithium bis(oxalato)borate.

The content of the (A) electrolyte in the nonaqueous electrolyte solution is preferably 0.01 to 5 mol/L, more preferably 0.1 to 3 mol/L.

[Component (B)]

As the nonaqueous organic solvent of the component (B), solvents conventionally known for lithium ion secondary batteries can be used. Specific examples thereof include alkylene carbonates such as a propylene carbonate, an ethylene carbonate, and a butylene carbonate; dialkyl carbonates such as a dimethyl carbonate, a methyl ethyl carbonate, and a diethyl carbonate; nitriles such as an acetonitrile; amides such as a dimethylformamide.

[Component (C)]

The compound of the component (C), which is an additive, is a compound having at least one aromatic ring and having no amino group, where at least one of hydrogen atoms bonded to a carbon atom of the aromatic ring of the compound is substituted with an optionally substituted amino group. The optionally substituted amino group is represented by the following formula (1).

[Chem. 3]

(1)

In the formula (1), the broken line is a bonding hand. R represents a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$. If the compound of the component (C) has two or more groups represented by formula (1), each R may be identical or different.

$Z^1$ represents a halogen atom, an amino group, a hydroxy group, a nitro group, a cyano group, an oxo group, a carboxy group, a sulfo group, a phosphoric acid group, a thiol group, a silyl group, or a monovalent aromatic hydrocarbon group having 6 to 60 or a monovalent heterocyclic ring-containing group having 2 to 60 carbon atoms, which is optionally substituted with $Z^3$. $Z^2$ represents a halogen atom, an amino group, a hydroxy group, a nitro group, a cyano group, an oxo group, a carboxy group, a sulfo group, a phosphoric acid group, a thiol group, a silyl group, or a monovalent aliphatic hydrocarbon group having 1 to 60, which is optionally substituted with $Z^3$. $Z^3$ represents a halogen atom, an amino group, a hydroxy group, a nitro group, a cyano group, an oxo group, a carboxy group, a sulfo group, a phosphoric acid group, a silyl group, or a thiol group.

The monovalent aliphatic hydrocarbon group is a group that is obtained by elimination of one hydrogen atom of an aliphatic hydrocarbon, and specific examples thereof include an alkyl group, an alkenyl group, and an alkynyl group. In addition, these groups may be linear, branched, or cyclic.

Examples of the alkyl group include: linear or branched alkyl groups, such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, and an n-decyl group; and cyclic alkyl groups, such as a cyclopropyl group, a cyclobutyl group, a cyclopentyl group, a cyclohexyl group, a cycloheptyl group, a cyclooctyl group, a cyclononyl group, a cyclodecyl group, a bicyclobutyl group, a bicyclopentyl group, a bicyclohexyl group, a bicycloheptyl group, a bicyclooctyl group, a bicyclononyl group, and a bicyclodecyl group.

Examples of the alkenyl group include a vinyl group, 1-propenyl group, 2-propenyl group, 1-methylvinyl group, 1-butenyl group, 2-butenyl group, 3-butenyl group, 2-methyl-1-propenyl group, 2-methyl-2-propenyl group, 1-ethylvinyl group, 1-methyl-1-propenyl group, 1-methyl-2-propenyl group, 1-pentenyl group, 1-decenyl group, and 1-eicosenyl group.

Examples of the alkynyl group include an ethynyl group, 1-propynyl group, 2-propynyl group, n-1-butynyl group, 2-butynyl group, 3-butynyl group, 1-methyl-2-propynyl group, 1-pentynyl group, 2-pentynyl group, 3-pentynyl group, 4-pentynyl group, 1-methyl-3-butynyl group, 2-methyl-3-butynyl group, 3-methyl-1-butynyl group, 1,1-dimethyl-2-propynyl group, 1-hexynyl group, 1-decynyl group, 1-pentadecynyl group, and 1-eicosinyl group.

The monovalent aromatic hydrocarbon group is a group obtained by elimination of one hydrogen atom of an aromatic hydrocarbon, and examples thereof include an aryl group and an aralkyl group.

Examples of the aryl group include a phenyl group, a methylphenyl group, an ethylphenyl group, an n-propylphenyl group, an isopropylphenyl group, a dimethylphenyl group, a biphenylyl group, a naphthyl group, an anthryl group, and a phenanthryl group.

Examples of the aralkyl group include a benzyl group, a methylphenylmethyl group, an ethylphenylmethyl group, an n-propylphenylmethyl group, an isopropylphenylmethyl group, a butylphenylmethyl group, an isobutylphenylmethyl group, a phenylethyl group, a naphthylmethyl group, and a phenylcyclohexyl group.

The monovalent heterocyclic ring-containing group is a group that is obtained by elimination of one hydrogen atom of a heterocyclic compound. Examples of the monovalent heterocyclic ring-containing group include 2-thienyl group, 3-thienyl group, 2-furanyl group, 3-furanyl group, 2-oxazolyl group, 4-oxazolyl group, 5-oxazolyl group, 3-isoxazolyl group, 4-isoxazolyl group, 5-isoxazolyl group, 2-thiazolyl group, 4-thiazolyl group, 5-thiazolyl group, 3-isothiazolyl group, 4-isothiazolyl group, 5-isothiazolyl group, 2-imidazolyl group, 4-imidazolyl group, 2-pyridyl group, 3-pyridyl group, and 4-pyridyl group.

Among these groups, R preferably represents a hydrogen atom, an alkyl group having 1 to 20 carbon atoms, an alkenyl group having 2 to 20 carbon atoms, an alkynyl group having 2 to 20 carbon atoms, or an aralkyl group having 7 to 20 carbon atoms, more preferably a hydrogen atom, an alkyl group having 1 to 12 carbon atoms, or an aralkyl group having 7 to 12 carbon atoms, even more preferably a hydrogen atom or an alkyl group having 1 to 4 carbon atoms, most preferably a hydrogen atom.

The compound of the component (C) preferably includes at least two groups represented by the formula (1). The safety can be further improved by including at least two groups represented by the formula (1). It is to be noted that the upper limit of the number of groups represented by formula (1) is not particularly limited as long as the number of substitutions is possible, but is typically about 6 from the viewpoint of production.

The compound of the component (C) is preferably represented by any of the following formulas (2) to (4).

[Chem. 4]

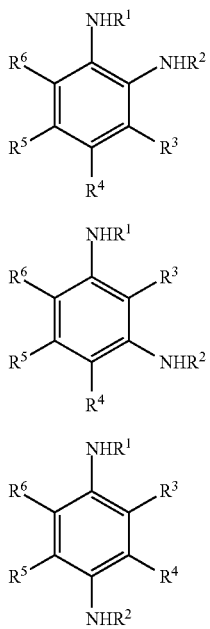

In the formulas (2) to (4), $R^1$ and $R^2$ each independently represent a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$. $R^3$ to $R^6$ each independently represent a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, a monovalent heterocyclic ring-containing group having 2 to 60 carbon atoms, which is optionally substituted with $Z^2$, a halogen atom, a hydroxy group, a nitro group, a cyano group, a boronic acid group, a sulfonic acid group, a phosphoric acid group, a silyl group, a thiol group, —O—$R^A$, —O—C(=O)—$R^B$, or —C(=O)—O—$R^C$, where $R^A$, $R^B$, and $R^C$ each independently represent a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$. Further, $Z^1$ and $Z^2$ represent the same as mentioned above.

Examples of the monovalent aliphatic hydrocarbon group, aromatic hydrocarbon group, and heterocyclic ring-containing group mentioned above include the same groups as described above.

$R^1$ and $R^2$ preferably represent a hydrogen atom, an alkyl group having 1 to 20 carbon atoms, an alkenyl group having 2 to 20 carbon atoms, an alkynyl group having 2 to 20 carbon atoms, or an aralkyl group having 7 to 20 carbon atoms, more preferably a hydrogen atom, an alkyl group having 1 to 12 carbon atoms, or an aralkyl group having 7 to 12 carbon atoms, even more preferably a hydrogen atom or an alkyl group having 1 to 4 carbon atoms, most preferably a hydrogen atom. $R^3$ to $R^6$ preferably represent a hydrogen atom, an alkyl group having 1 to 20 carbon atoms, an alkenyl group having 2 to 20 carbon atoms, an alkynyl group having 2 to 20 carbon atoms, an aralkyl group having 7 to 20 carbon atoms, —O—$R^A$, —O—C(=O)—$R^B$, or —C(=O)—O—$R^C$, more preferably a hydrogen atom, an alkyl group having 1 to 12 carbon atoms, an aralkyl group having 7 to 20 carbon atoms, an alkoxy group having 1 to 12 carbon atoms, an alkyloxycarbonyl group having 2 to 12 carbon atoms, or an alkylcarbonyloxy group having 2 to 12 carbon atoms, even more preferably a hydrogen atom or an alkyl group having 1 to 4 carbon atoms, most preferably a hydrogen atom. Particularly, all of $R^1$ to $R^6$ preferably represent hydrogen atoms.

As the compound of the component (C), a compound represented by the following formula (5) is also preferred.

[Chem. 5]

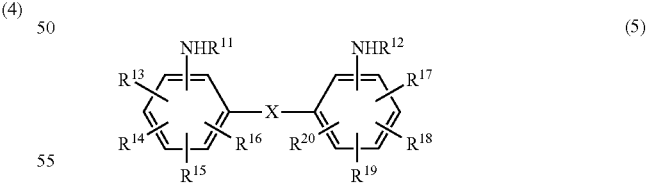

In the formula (5), $R^{11}$ and $R^{12}$ each independently represent a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$. $R^{13}$ to $R^{20}$ each independently represent a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$, or a halogen atom, a hydroxy group, a nitro group, a cyano group, a boronic acid group, a sulfonic acid group, a phosphoric acid group, a silyl group, a thiol group, —O—$R^A$, —O—C(=O)—$R^B$, or —C(=O)—O—$R^C$. Further, $R^A$, $R^B$, $R^C$, $Z^1$, and $Z^2$ represent the same as mentioned above.

In the formula (5), X represents a single bond, an ester bond, an amide bond, a urethane bond, a urea bond, an ether bond, a thioether bond, —N($R^D$)— (in the formula, $R^1$ represents a hydrogen atom, a monovalent aliphatic hydrocarbon group having 1 to 60 carbon atoms, or a monovalent aromatic hydrocarbon group having 6 to 60 carbon atoms), a carbonate group, a carbonyl group, a sulfonyl group, a divalent aliphatic hydrocarbon group having 1 to 60 carbon atoms, which is optionally substituted with $Z^1$, a divalent aromatic hydrocarbon group having 6 to 60 carbon atoms, which is optionally substituted with $Z^2$, or a divalent heterocyclic ring-containing group having 2 to 60 carbon atoms, which is optionally substituted with $Z^2$.

The divalent aliphatic hydrocarbon group is a group that is obtained by further elimination of one hydrogen atom from the monovalent aliphatic hydrocarbon group described above, and specific examples thereof include alkanediyl groups such as a methylene group, an ethane-1,1-diyl group, an ethane-1,2-diyl group, a propane-1,2-diyl group, propane-1,3-diyl group, a butane-1,4-diyl group, a pentane-1,5-diyl group, and a hexane-1,6-diyl group; cycloalkanediyl groups such as a cyclohexane-1,1-diyl group, a cyclohexane-1,2-diyl group, and a cyclohexane-1,4-diyl group; alkenediyl groups such as an ethene-1,1-diyl group, an ethene-1,2-diyl group, and a 2-butene-1,4-diyl group; and alkynediyl groups such as an ethyne-1,2-diyl group.

The divalent aromatic hydrocarbon group is a group that is obtained by further elimination of one hydrogen atom from the monovalent aromatic hydrocarbon group mentioned above, and specific examples thereof include a phenylene group, a methylphenylene group, an ethylphenylene group, an n-propylphenylene group, an isopropylphenylene group, a naphthalenediyl group, a biphenyldiyl group, and a terphenyldiyl group.

The divalent heterocyclic ring-containing group is a group that is obtained by further elimination of one hydrogen atom from the monovalent heterocyclic ring-containing group described above, and specific examples thereof include a thiophenediyl group, a furandiyl group, an oxazolinediyl group, an isooxazolinediyl group, a thiazolediyl group, an isothiazolediyl group, an imidazolediyl group, and a pyridinediyl group.

$R^{11}$ and $R^{12}$ preferably represent a hydrogen atom, an alkyl group having 1 to 20 carbon atoms, an alkenyl group having 2 to 20 carbon atoms, an alkynyl group having 2 to 20 carbon atoms, or an aralkyl group having 2 to 20 carbon atoms, more preferably a hydrogen atom, an alkyl group having 1 to 12 carbon atoms, or an aralkyl group having 7 to 12 carbon atoms, even more preferably a hydrogen atom or an alkyl group having 1 to 4 carbon atoms, most preferably a hydrogen atom. $R^{13}$ to $R^{20}$ preferably represent a hydrogen atom, an alkyl group having 1 to 20 carbon atoms, an alkenyl group having 2 to 20 carbon atoms, an alkynyl group having 2 to 20 carbon atoms, an aralkyl group having 7 to 20 carbon atoms, —O—$R^A$, —O—C(=O)—$R^B$, or —C(=O)—O—$R^C$, more preferably a hydrogen atom, an alkyl group having 1 to 12 carbon atoms, an aralkyl group having 7 to 12 carbon atoms, an alkoxy group having 1 to 12 carbon atoms, an alkyloxycarbonyl group having 2 to 12 carbon atoms, or an alkylcarbonyloxy group having 1 to 12 carbon atoms, even more preferably a hydrogen atom or an alkyl group having 1 to 4 carbon atoms, most preferably a hydrogen atom. Particularly, all of $R^{11}$ to $R^{20}$ preferably represent hydrogen atoms.

Furthermore, X preferably represents a single bond, an ester bond, an amide bond, a urethane bond, a urea bond, an ether bond, a thioether bond, —N($R^E$)— (in the formula, $R^E$ represents a hydrogen atom, a monovalent aliphatic hydrocarbon group 1 to 6 carbon atoms, or a monovalent aromatic hydrocarbon group having 6 to 12 carbon atoms), a carbonate group, a carbonyl group, a sulfonyl group, a divalent aliphatic hydrocarbon group having 1 to 6 carbon atoms, which is optionally substituted with $Z^1$, a divalent aromatic hydrocarbon group having 6 to 12 carbon atoms, which is optionally substituted with $Z^2$, or a divalent heterocyclic ring-containing group having 2 to 12 carbon atoms, which is optionally substituted with $Z^2$, more preferably a single bond, an ester bond, an amide bond, a urethane bond, a urea bond, an ether bond, a thioether bond, —N($R^F$)—(in the formula, $R^F$ represents a hydrogen atom or a monovalent aliphatic hydrocarbon group having 1 to 6 carbon atoms), a carbonate group, a carbonyl group, or a sulfonyl group, even more preferably a single bond, an ether bond, a thioether bond, and —NH—, most preferably a single bond.

The content of the component (C) in the nonaqueous electrolyte solution is preferably 0.01 to 10% by weight, more preferably 0.1 to 1% by weight. As long as the content of the component (C) falls within the range mentioned above, it is possible to provide such a nonaqueous electrolyte solution that improves safety, but at the same time, keeps battery characteristics from being degraded.

The nonaqueous electrolyte solution may further include conventionally known additives for lithium ion secondary batteries (hereinafter, also referred to as other additives). Other additives include carbonates such as a vinylene carbonate, a vinyl ethylene carbonate, and a fluoroethylene carbonate; sulfur-containing compounds such as 1-propene-1,3-sultone; phosphoric acid esters such as trimethyl phosphate and triethyl phosphate; phosphorus acid esters such as trimethyl phosphite and triethylphosphite; cyclic phosphazene compounds such as monoethoxypentafluorocyclotriphosphazene; and aromatic compounds such as cyclohexylbenzene and biphenyl. The content of other additives is not particularly limited as long as the effects of the present invention are not impaired.

[Positive Electrode and Negative Electrode]

The positive electrode and the negative electrode (hereinafter, which are collectively referred to as electrodes) have electrode mixture layers provided on current collectors. In addition, if necessary, an undercoat layer may be formed between the current collector and the electrode mixture layer in order to enhance the adhesion between the electrodes and to reduce the resistance of the contact interface.

As the current collectors, current collectors conventionally known for lithium ion secondary batteries can be used. Specific examples thereof include thin films of copper, aluminum, titanium, stainless steel, nickel, gold, silver, and alloys thereof, carbon materials, metal oxides, and conductive polymers. The thickness of the current collector is not particularly limited, but is preferably 1 to 100 μm in the present invention.

The electrode mixture layer can be formed by applying an electrode slurry containing an active material, a binder polymer, and if necessary, a solvent, onto the current collector (an undercoat layer in the case of forming the undercoat layer), and drying the slurry naturally or by heating.

As the active material, various active materials for use in lithium ion secondary batteries can be used. For example, a chalcogen compound capable of adsorbing/desorbing lithium ions or a lithium ion-containing chalcogen compound, a polyanion-based compound, or a simple substance of sulfur and a compound thereof can be used as the positive electrode active material.

Examples of such a chalcogen compound capable of adsorbing and desorbing lithium ions include $FeS_2$, $TiS_2$, $MoS_2$, $V_2O_6$, $V_6O_{13}$, and $MnO_2$.

Examples of the lithium ion-containing chalcogen compound include compounds represented by $Li_xNi_yM_{1-y}O_2$ (provided that M represents at least one or more metal elements selected from Co, Mn, Ti, Cr, V, Al, Sn, Pb, and Zn, with $0.05 \le x \le 1.10$ and $0.5 \le y \le 1.0$). Examples of such compounds include $LiCoO_2$, $LiMnO_2$, $LiMn_2O_4$, $LiMo_2O_4$, $LiV_3O_8$, and $LiNiO_2$.

Examples of the polyanion-based compound include a lithium iron phosphate ($LiFePO_4$). Examples of the sulfur compound include $Li_2S$ and a rubeanic acid.

Among these compounds, a lithium ion-containing chalcogen compound, in particular, a lithium composite layer oxide is preferred as the positive electrode active material. As the lithium composite layer oxide, a compound represented by the following formula (6) is preferred.

$$Li(Ni_aCo_bMn_c)O_2 \qquad (6)$$

wherein a, b, and c are numbers that satisfy $0 \le a \le 1$, $0 \le b \le 1$, and $0 \le c \le 1$, and $a+b+c=1$.

As the compound represented by the formula (6), $LiCoO_2$, $LiMnO_2$, $LiNiO_2$, and a compound with $a=\frac{1}{3}$, $b=\frac{1}{3}$, and $c=\frac{1}{3}$ in the formula (6), a compound with $a=0.5$, $b=0.2$, and $c=0.3$ in the formula (6), a compound with $a=0.6$, $b=0.2$, and $c=0.2$ in the formula (6), and a compound with $a=0.8$, $b=0.1$, and $c=0.1$ in the formula (6) are preferred, and $LiCoO_2$ is more preferred.

In contrast, alkali metals, alkali alloys, at least one simple substance selected from the elements of Groups 4 to 15 of the periodic table that occlude and release lithium ions, and oxides, sulfides, and nitrides thereof, or carbon materials capable of reversibly occluding and releasing lithium ions can be used as the negative electrode active material constituting the negative electrode.

Examples of the alkali metals include Li, Na, and K, and examples of the alkali metal alloys include Li—Al, Li—Mg, Li—Al—Ni, Na—Hg, and Na—Zn.

Examples of the simple substance of at least one element selected from the elements of Groups 4 to 15 of the periodic table that occludes and releases lithium ions include silicon, tin, aluminum, zinc, and arsenic.

Similarly, examples of the oxides include a tin silicon oxide ($SnSiO_3$), a lithium bismuth oxide ($Li_3BiO_4$), a lithium zinc oxide ($Li_2ZnO_2$), a lithium titanium oxide ($Li_4Ti_5O_{12}$), and titanium oxide.

Similarly, examples of the sulfides include a lithium iron sulfide ($Li_xFeS_2$ ($0 \le x \le 3$)) and a lithium copper sulfide ($Li_xCuS$ ($0 \le x \le 3$)).

Similarly, examples of the nitrides includes lithium-containing transition metal nitrides, specifically, $Li_xM_yN$ (M=Co, Ni, or Cu, $0 \le x \le 3$, $0 \le y \le 0.5$), and lithium iron nitrides ($Li_3FeN_4$).

Examples of the carbon materials capable of reversibly occluding and releasing lithium ions include graphite, carbon black, coke, glassy carbon, carbon fibers, carbon nanotubes, and sintered bodies thereof.

The binder polymer can be appropriately selected from known materials and then used, and examples of the materials include a polyvinylidene fluoride (PVdF), polyvinylpyrrolidone, polytetrafluoroethylene, a tetrafluoroethylene-hexafluoropropylene copolymer, a vinylidene fluoride-hexafluoropropylene copolymer (P(VDF-HFP)), a vinylidene fluoride-chlorotrifluoroethylene copolymer (P(VDF-CTFE)), a polyvinyl alcohol, a polyimide, an ethylene-propylene-diene ternary copolymer, a styrene-butadiene rubber, CMC, a polyacrylic acid (PAA), and conductive polymers such as polyaniline. These binder polymers can be used alone, or two or more thereof can be used in combination.

It is to be noted that the additive amount of the binder polymer is preferably 0.1 to 20 parts by weight, and in particular, 1 to 10 parts by weight, based on 100 parts by weight of the active material.

As the solvent, known solvents can be used, and examples thereof include water; and organic solvents, for example, ethers such as tetrahydrofuran (THF), diethyl ether, and 1,2-dimethoxyethane (DME); halogenated hydrocarbons such as methylene chloride, chloroform, and 1,2-dichloroethane; amides such as N,N-dimethylformamide (DMF), N,N-dimethylacetamide (DMAc), and N-methyl-2-pyrrolidone (NMP); ketones such as acetone, methyl ethyl ketone, methyl isobutyl ketone, and cyclohexanone; alcohols such as methanol, ethanol, isopropanol, n-propanol, and butanol; aliphatic hydrocarbons such as n-heptane, n-hexane, and cyclohexane; aromatic hydrocarbons such as benzene, toluene, xylene, and ethylbenzene; glycol ethers such as ethylene glycol monoethyl ether, ethylene glycol monobutyl ether, and propylene glycol monomethyl ether; and glycols such as ethylene glycol and propylene glycol. These solvents can be used alone, or two or more thereof can be used in mixture.

The solvent may be selected appropriately from these solvents depending on the type of the binder, and NMP is preferred in the case of a water-insoluble binder such as PVdF, whereas water is preferred in the case of a water-soluble binder such as PAA.

Further, the electrode slurry may contain a conductive auxiliary agent. Examples of the conductive auxiliary agent include carbon black, Ketjen black, acetylene black, carbon whiskers, carbon nanotubes, carbon fibers, natural graphite, artificial graphite, titanium oxides, ruthenium oxides, aluminums, and nickel.

Examples of the method for applying the electrode slurry include a spin coating method, a dip coating method, a flow coating method, an ink-jet method, a spray coating method, a bar coating method, a gravure coating method, a slit coating method, a roll coating method, a flexographic printing method, a transfer printing method, brush coating, a blade coating method, and an air knife coating method. Among these methods, the dip coating method, the bar coating method, the blade coating method, the slit coating method, the roll coating method, the gravure coating method, and the flexographic printing method are preferred in terms of operating efficiency and the like.

In addition, the temperature in the case of heating and drying the electrode slurry is also arbitrary, but is preferably about 50 to 400° C., more preferably about 80 to 150° C.

As the undercoat layer, layers known for electrodes can be used, and for example, the layer described in WO 2016/194747 can be used.

The site where the electrode mixture layer is formed may be set appropriately depending on the cell form of the lithium ion secondary battery used, and may be the entire surface of the current collector (or the undercoat layer) or a part thereof, but in the case of use as an electrode structure with a metal tab and an electrode joined by welding such as ultrasonic welding for the purpose of use in a laminated cell or the like, the electrode slurry is preferably applied to a part of the surface of the current collector (or undercoat layer) to form an electrode mixture layer in order to leave the welded part. In particular, in a laminated cell application, the electrode slurry is preferably applied to the part of the current collector (or the undercoat layer) other than a periphery thereof left, thereby forming an electrode mixture layer.

The thickness of the electrode mixture layer is preferably 10 to 500 µm, more preferably 10 to 300 µm, even more preferably 20 to 100 µm in consideration of the balance between the capacity and resistance of the battery.

Also, the electrodes can be subjected to pressing, if desired. For the pressing method, commonly adopted methods can be used, but a die pressing method or a roll pressing method is particularly preferred. The pressing pressure in the roll pressing method is not particularly limited, but is preferably 0.2 to 3 ton/cm.

As long as the lithium ion secondary battery according to the present invention includes the above-described positive electrode and negative electrode, and nonaqueous electrolyte solution, conventionally known members can be used as the other constituent members. For example, examples of the separator include a cellulose-based separator and a polyolefin-based separator.

The form of the lithium ion secondary battery according to the present invention is not particularly limited, and cells can be adopted in various conventionally known forms such as a cylindrical type, a flattened wound rectangular type, a stacked rectangular type, a coin type, a flattened wound laminate type, and a stacked laminate type.

In the case of application to a coin type, the above-mentioned electrodes may be punched into a predetermined disc shape, and then used. For example, a lithium ion secondary battery can be prepared by placing a predetermined number of lithium foils punched into a predetermined shape on a coin cell lid with a washer and a spacer welded thereto, stacking thereon a separator in the same shape, impregnated with an electrolyte solution, further stacking thereon the electrodes with the electrode mixture layers down, placing a case and a gasket thereon, and then sealing the stacked cell with a coin cell swaging machine.

In the case of application to a stacked laminate type, an electrode structure may be used, which is obtained by welding a metal tab at a part (welded part) where no electrode mixture layer is formed. In this case, the number of electrodes constituting the electrode structure may be one or more, but typically, more than one electrode is used for both positive and negative electrodes. More than one electrode for forming the positive electrode and more than one electrode for forming the negative electrode are preferably stacked alternately one by one, and in such a case the separator described above is preferably interposed between the positive electrode and the negative electrode.

The metal tab may be welded at the welded part of the outermost electrode among the multiple electrodes, or may be welded with the metal tab sandwiched between the welded parts of any two adjacent electrodes among the multiple electrodes. The material of the metal tab is not particularly limited as long as the material is commonly used for lithium ion secondary batteries, and examples thereof include metals such as nickel, aluminum, titanium, and copper; and alloys such as stainless steel, nickel alloys, aluminum alloys, titanium alloys, and copper alloys. Among these materials, the material composed to include at least one metal selected from aluminum, copper, and nickel is preferred in consideration of welding efficiency. The metal tab preferably has a foil shape, and preferably has a thickness of about 0.05 to 1 mm.

For the welding method, known methods for use in welding metals to each other can be used, specific examples thereof include TIG welding, spot welding, laser welding, and ultrasonic welding, and the electrode and the metal tab are preferably joined by ultrasonic welding.

Examples of the method for ultrasonic welding include a method of disposing more than one electrode between an anvil and a horn, and with a metal tab disposed at the welded part, applying ultrasonic waves to weld the electrodes in a collective manner, and a method of first welding electrodes to each other, and thereafter, welding a metal tab.

According to the present invention, any of the methods will not only weld the metal tab and the electrode at the welded part, but also ultrasonically weld the electrodes to each other. The pressure, frequency, output, processing time, and the like for welding are not particularly limited, and may be set appropriately in consideration of the material used and the like.

The electrode structure prepared in the manner described above is housed in a laminate pack, and subjected to heat sealing after injecting the electrolyte solution described above, thereby providing a laminated cell.

The lithium ion secondary battery according to the present invention is charged for use in the range of 4.35 to 5 V, preferably 4.35 to 4.7 V. The use of the nonaqueous electrolyte solution with the above-described additive (component (C)) added thereto enables use in such high-voltage charging.

EXAMPLES

Hereinafter, the present invention is described more specifically with reference to Preparation Examples, and Examples and Comparative Examples, but the present invention is not limited to the following Examples.

Example 1

To a solution obtained by dissolving $LiPF_6$ in a carbonate mixed solvent (ethylene carbonate:ethyl methyl carbonate=1:3 (volume ratio)) to reach 1 mol/L, vinylene carbonate and 1-propene-1,3-sultone were added respectively to reach 2% by weight and 0.5% by weight, and 0.72% by weight of 1,2-phenylenediamine was further added thereto as an additive, thereby preparing a nonaqueous electrolyte solution.

A paste-like positive electrode mixture slurry was prepared by mixing 100 parts by weight of a positive electrode active material ($LiCoO_2$, CELLSEED (registered trademark) C20F, manufactured by NIPPON CHEMICAL INDUSTRIAL CO., LTD.), 3 parts by weight of a conductive agent (acetylene black, DENKA BLACK powdery product, manufactured by Denka Company Limited), 37.5 parts by weight of a binder (polyvinylidene fluoride: PVdF, #7208 (8% NMP solution), manufactured by KUREHA CORPORATION), and 13.2 parts by weight of NMP (manufactured by Mitsubishi Chemical Corporation). Subsequently, the positive electrode mixture slurry was uniformly applied to both surfaces of a positive electrode current collector (aluminum foil, thickness: 20 µm, manufactured by UACJ Foil Corporation) with the use of a coating device, dried, and finally compressed with the use of a roll press machine, thereby preparing a positive electrode of 18.0 mg/cm² in one-side mixture weight and of 55 μm in one-side mixture thickness.

A paste-like negative electrode mixture slurry was prepared by mixing 100 parts by weight of a negative electrode active material (graphite, MAG-E, manufactured by Hitachi Chemical Company, Ltd.), 1.1 parts by weight of a thickener (CMC, product number 2200, manufactured by Daicel Fine-Chem Ltd.), 3.1 parts by weight of a binder (SBR, TRD2001 (48.5% aqueous dispersion), manufactured by JSR Corporation), and 131 parts by weight of pure water. Subsequently, the negative electrode mixture slurry was uniformly applied to both surfaces of a negative electrode current collector (copper foil, thickness: 16.5 μm, manufactured by UACJ Foil Corporation) with the use of a coating device, dried, and finally compressed with the use of a roll press machine, thereby preparing a positive electrode of 12.5 mg/cm² in one-side mixture weight and of 96 μm in one-side mixture thickness.

To the exposed part of the aluminum foil of the positive electrode and the exposed part of the copper foil of the negative electrode, a positive electrode tab made of aluminum and a negative electrode tab made of nickel were respectively welded to form lead parts, and the electrodes were wound in a spiral form with a separator (thickness: 25 μm, manufactured by Asahi Kasei Corp.) interposed and stacked therebetween, thereby preparing a wound electrode body. The wound electrode body was further crushed and molded into a flattened shape to obtain a flattened wound electrode body. The flattened wound electrode body was housed in an outer case made of an aluminum laminate film (EL408PH, manufactured by Dai Nippon Printing Co., Ltd.), and subjected to sealing after injecting the above-described nonaqueous electrolyte solution to reach 130% by volume with respect to the pore volume of the positive and negative electrodes and separator, thereby preparing a flattened lithium ion secondary battery. The capacity of this battery at an operating voltage of 3 to 4.5 V was 1.2 Ah.

Finally, the prepared battery was subjected to constant-current and constant-voltage charging at 4.5 V from 400 mA (rate corresponding to ⅓) to 40 mA (rate corresponding to 1/30), as a short-circuit test sample A.

Example 2

A short-circuit test sample B was prepared by the same manner as in Example 1, except that 1,4-phenylenediamine was used as an additive.

Comparative Example 1

A short-circuit test sample C was prepared by the same manner as in Example 1, except that no additive was used.

[Short Circuit Test]

Thermocouples for battery temperature monitoring were placed in the centers of the short-circuit test samples A to C. To the center of the short-circuit test sample on the side opposite to the surface with the thermocouple placed thereon, a zirconia ball of 10 mm in diameter was dropped from above at a speed of 0.1 mm/sec while monitoring the battery voltage, thereby compressing the center of the battery. The battery voltage reaching ⅓ or less of that before the start of the test was regarded as the occurrence of a short circuit, and the zirconia ball was stopped from being dropped. In this test, the battery was considered unsafe if the battery temperature increased to 400° C. or higher and caused battery to emit smoke, or considered safe if the battery temperature remained 110° C. or lower without any smoke emitted from the battery. Table 1 shows the test results in the case where the number of trials was 3 for each of the short-circuit test samples A to C.

TABLE 1

| | Additive | Unsafe battery Ratio | Battery maximum temperature (° C.) |
|---|---|---|---|
| Example 1 | 1,2-phenylenediamine | 1/3 | 108 |
| Example 2 | 1,4-phenylenediamine | 1/3 | 105 |
| Comparative Example 1 | No | 3/3 | 512 |

As shown in Table 1, in the case of battery with the nonaqueous electrolyte solution free of additive (Comparative Example 1), the temperature of the battery increased to 512° C. after short-circuiting, thereby causing the battery to emit heavy smoke in all of the three trials., whereas in the case of the battery with the nonaqueous electrolyte solution containing 1,2-phenylenediamine (Example 1) or 1,4-phenylenediamine (Example 2) as an additive, the small amount of 0.72% by weight kept the increase in battery temperature after short-circuiting down to 110° C. or lower, without any smoke emitted in two of the three trials.

The invention claimed is:
1. A lithium ion secondary battery comprising a nonaqueous electrolyte solution, and a positive electrode and a negative electrode capable of occluding and releasing lithium,
wherein the nonaqueous electrolyte solution comprises an (A) electrolyte, a (B) nonaqueous organic solvent, and a (C) compound represented by any of the following formulas (2) to (4), and
the lithium ion secondary battery charged in a range of 4.35 to 5 V for use;

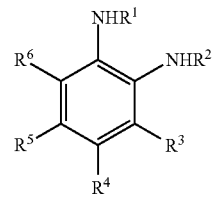

(2)

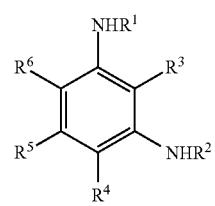

(3)

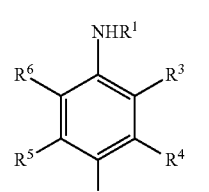

(4)

wherein $R^1$ and $R^2$ each independently represent a hydrogen atom, a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$, wherein $R^1$ and $R^2$ do not include sec-butyl;

$R^3$ to $R^6$ each independently represent a hydrogen atom, a monovalent aliphatic hydrocarbon group having 1 to 60 carbon atoms, which is optionally substituted by $Z^1$, a monovalent aromatic hydrocarbon group having 6 to 60 carbon atoms, which is optionally substituted by $Z^2$, a monovalent heterocyclic ring-group having 2 to 60 carbon atoms, which is optionally substituted with $Z^2$, a halogen atom, a hydroxy group, a nitro group, a cyano group, a boronic acid group, a sulfonic acid group, a phosphoric acid group, a silyl group, a thiol group, —O—$R^A$, —O—C(=O)—$R^B$, or —C(=O)—O—$R^C$, and $R^A$, $R^B$, and $R^C$ each independently represent a monovalent aliphatic hydrocarbon group having 1 to 60 carbon atoms, which is optionally substituted with $Z^1$, a monovalent aromatic hydrocarbon group having 6 to 60 carbon atoms, which is optionally substituted with $Z^2$, or a monovalent heterocyclic ring-containing group having 2 to 60 carbon atoms, which is optionally substituted with $Z^2$;

$Z^1$ represents a halogen atom, an amino group, a hydroxy group, a nitro group, a cyano group, an oxo group, a carboxy group, a sulfo group, a phosphoric acid group, a thiol group, a silyl group, or a monovalent aromatic hydrocarbon group having 6 to 60 carbon atoms or a monovalent heterocyclic ring-containing group having 2 to 60 carbon atoms, which is optionally substituted with $Z^3$;

$Z^2$ represents a halogen atom, an amino group, a hydroxy group, a nitro group, a cyano group, an oxo group, a carboxy group, a sulfo group, a phosphoric acid group, a thiol group, a silyl group, or a monovalent aliphatic hydrocarbon group having 1 to 60 carbon atoms, which is optionally substituted with $Z^3$;

$Z^3$ represents a halogen atom, an amino group, a hydroxy group, a nitro group, a cyano group, an oxo group, a carboxy group, a sulfo group, a phosphoric acid group, a silyl group, or a thiol group; and the broken line is a bond.

2. The lithium ion secondary battery according to claim 1, wherein $R^1$ and $R^2$ both represent hydrogen atoms.

3. The lithium ion secondary battery according to claim 1, wherein $R^3$ to $R^6$ all represent hydrogen atoms.

4. The lithium ion secondary battery according to claim 1, wherein the compound of the component (C) is included at 0.01 to 10% by weight in the nonaqueous electrolyte solution.

5. The lithium ion secondary battery according to claim 4, wherein the compound of the component (C) is included at 0.1 to 1% by weight in the nonaqueous electrolyte solution.

6. The lithium ion secondary battery according to claim 1, wherein a positive electrode active material included in the positive electrode is a lithium composite layer oxide.

7. The lithium ion secondary battery according to claim 6, wherein the lithium composite layer oxide is a compound represented by the following formula (6):

$$Li(Ni_aCo_bMn_c)O_2 \qquad (6)$$

wherein a, b, and c represent numbers that satisfy 0≤a≤1, 0≤b 1, 0≤c≤1, and a+b+c=1.

8. The lithium ion secondary battery according to claim 7, wherein the compound represented by the formula (6) is $LiCoO_2$.

9. The lithium ion secondary battery according to claim 1, wherein the nonaqueous organic solvent of the component (B) includes at least one selected from the group consisting of alkylene carbonates, dialkyl carbonates, nitriles and amides.

10. The lithium ion secondary battery according to claim 9, wherein the nonaqueous electrolyte solution further comprises at least one additive selected from the group consisting of a vinylene carbonate, a vinyl ethylene carbonate, a fluoroethylene carbonate, sulfur-containing compounds, phosphoric acid esters, phosphorus acid esters, cyclic phosphazene compounds and aromatic compounds.

* * * * *